Aug. 26, 1947. H. M. HERBENER 2,426,503
FOLDER, BILL FOLDER, AND POCKET CONSTRUCTION
Filed Oct. 29, 1943 10 Sheets-Sheet 2
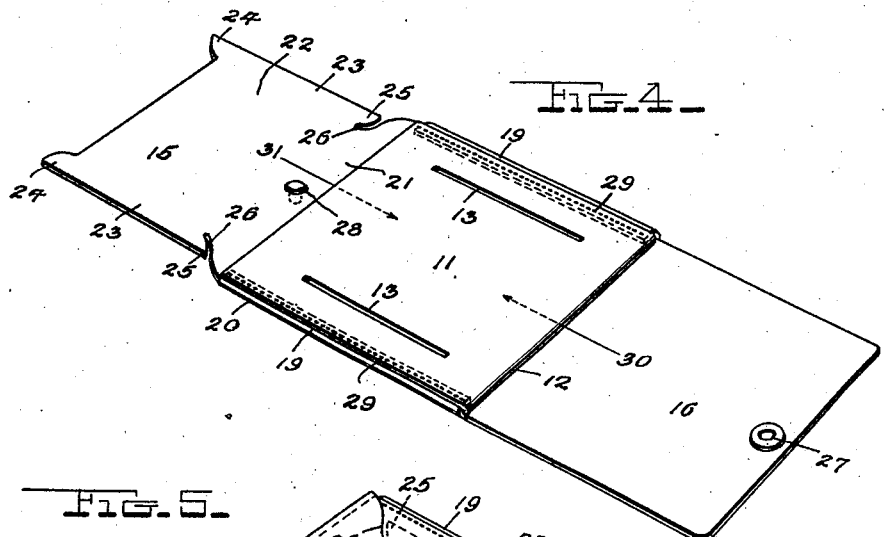
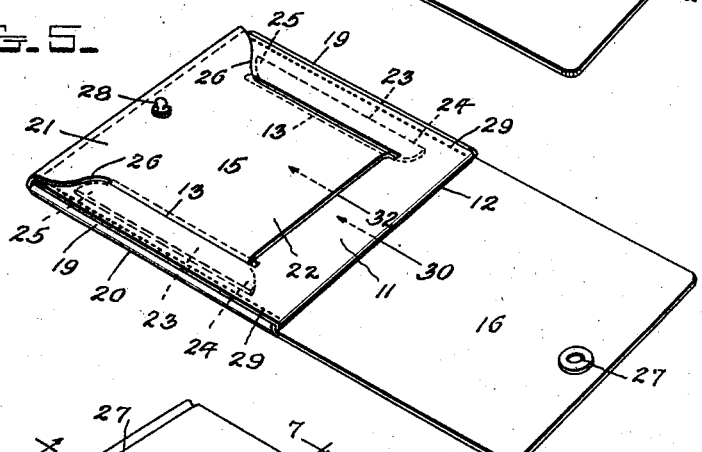
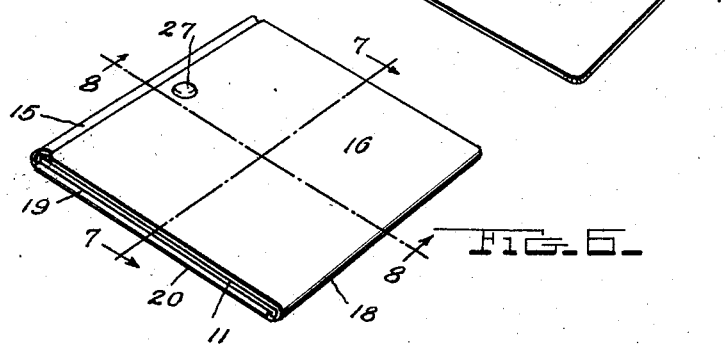
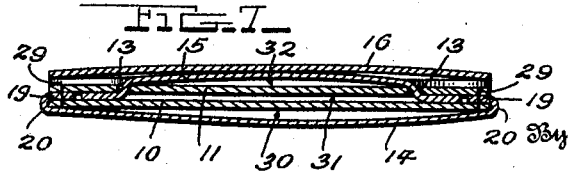
Inventor
Henry M. Herbener.

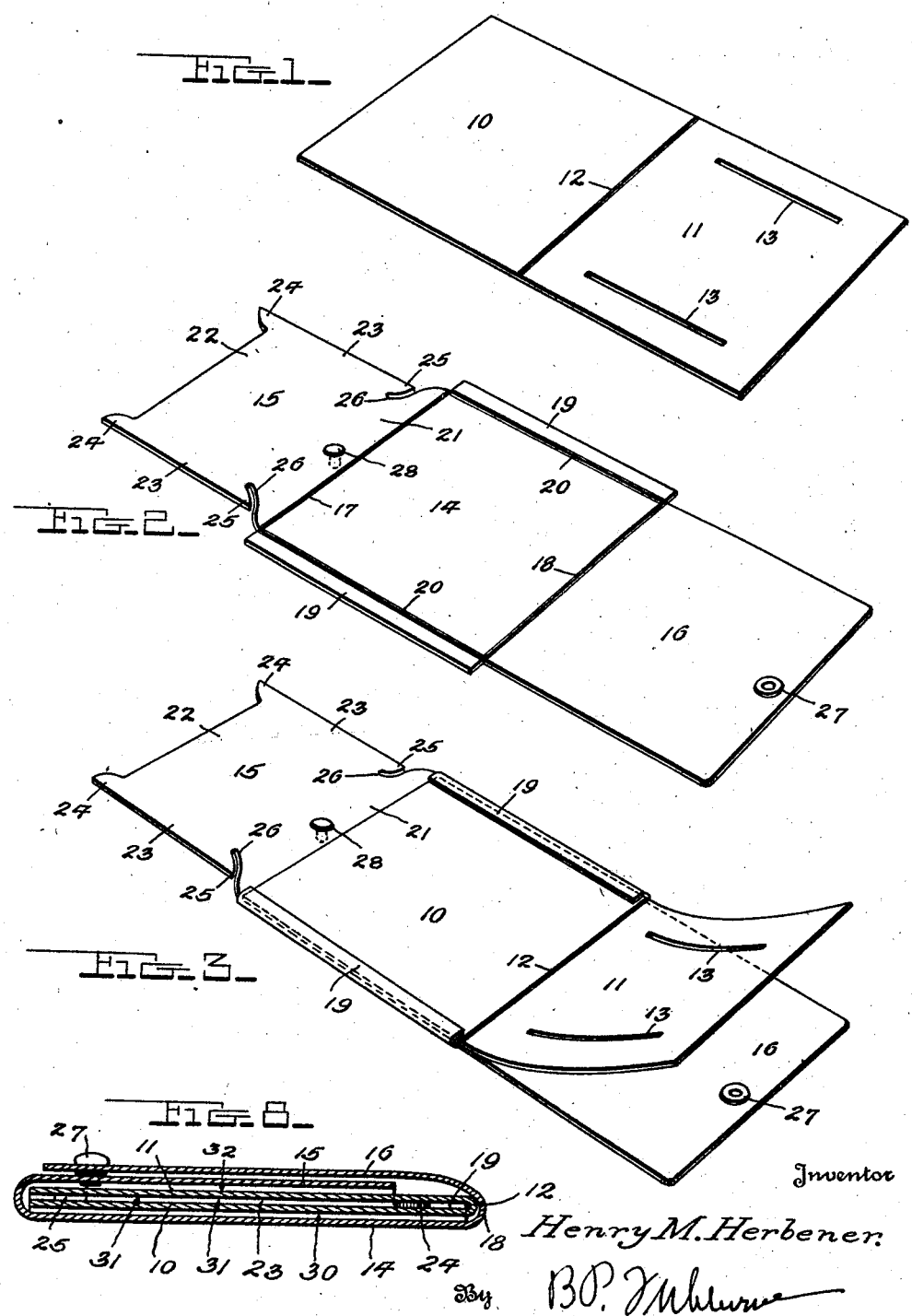

Aug. 26, 1947.    H. M. HERBENER    2,426,503
FOLDER, BILL FOLDER, AND POCKET CONSTRUCTION
Filed Oct. 29, 1943    10 Sheets-Sheet 3
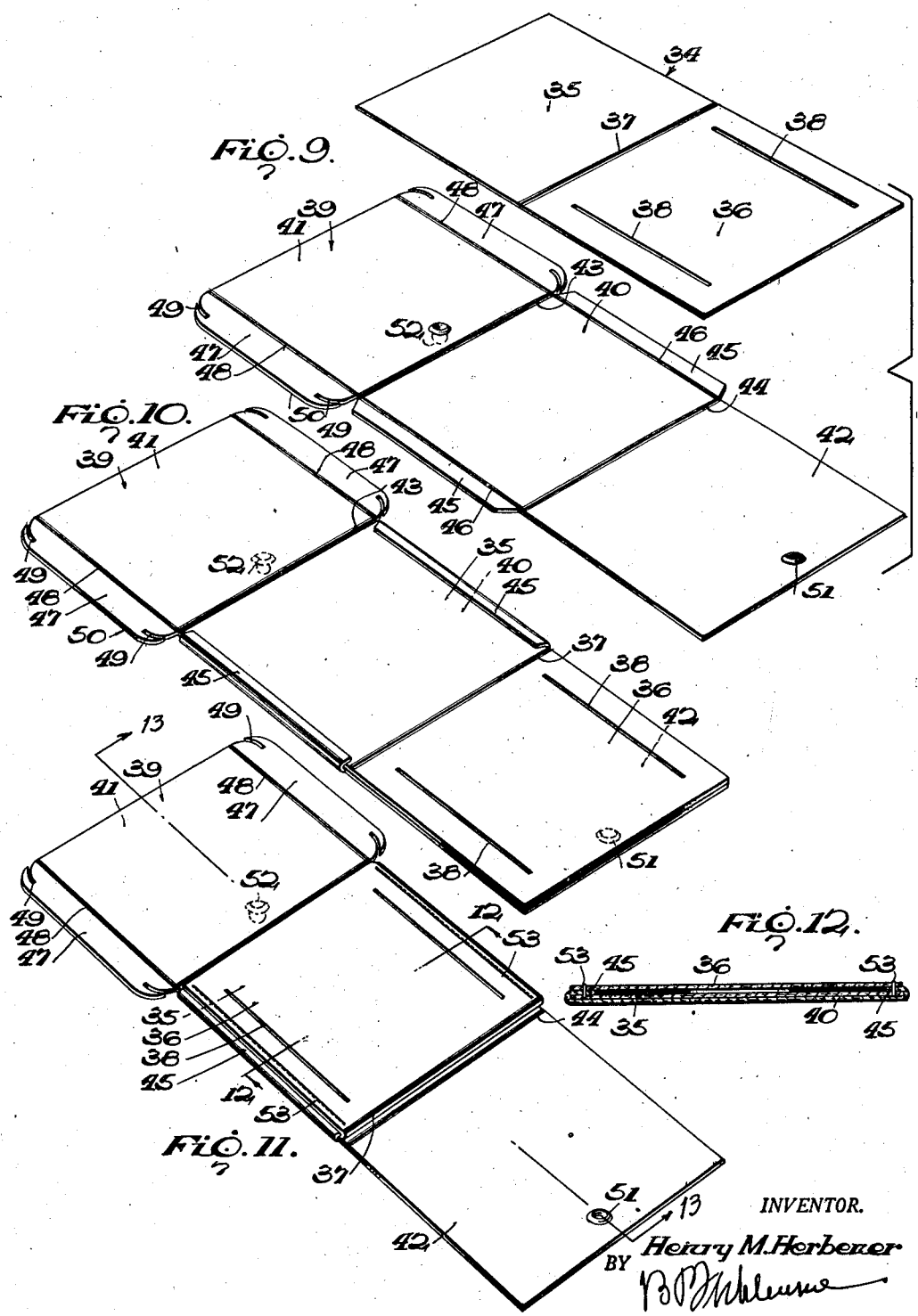
INVENTOR.
Henry M. Herbener
BY
ATTORNEY

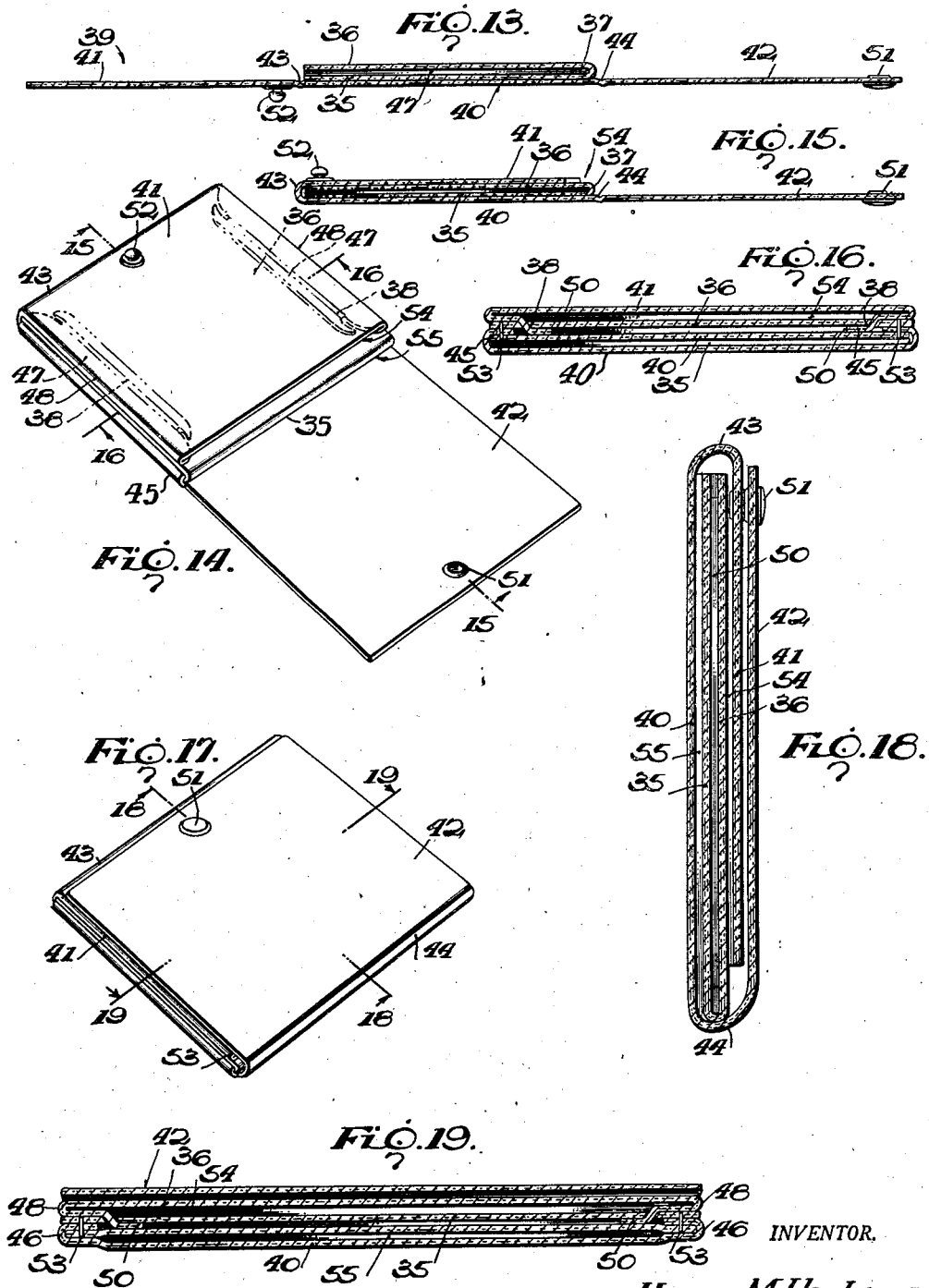

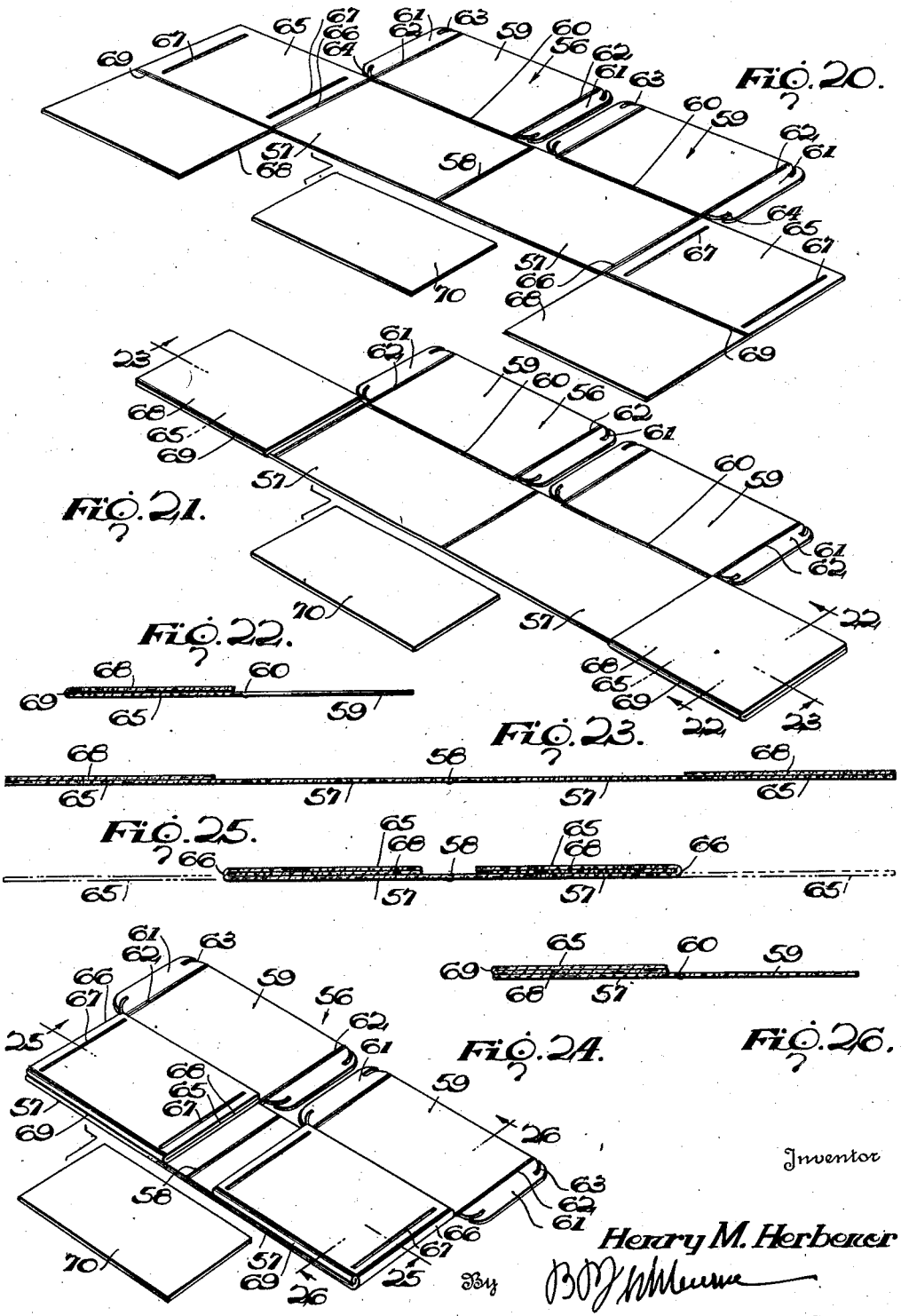

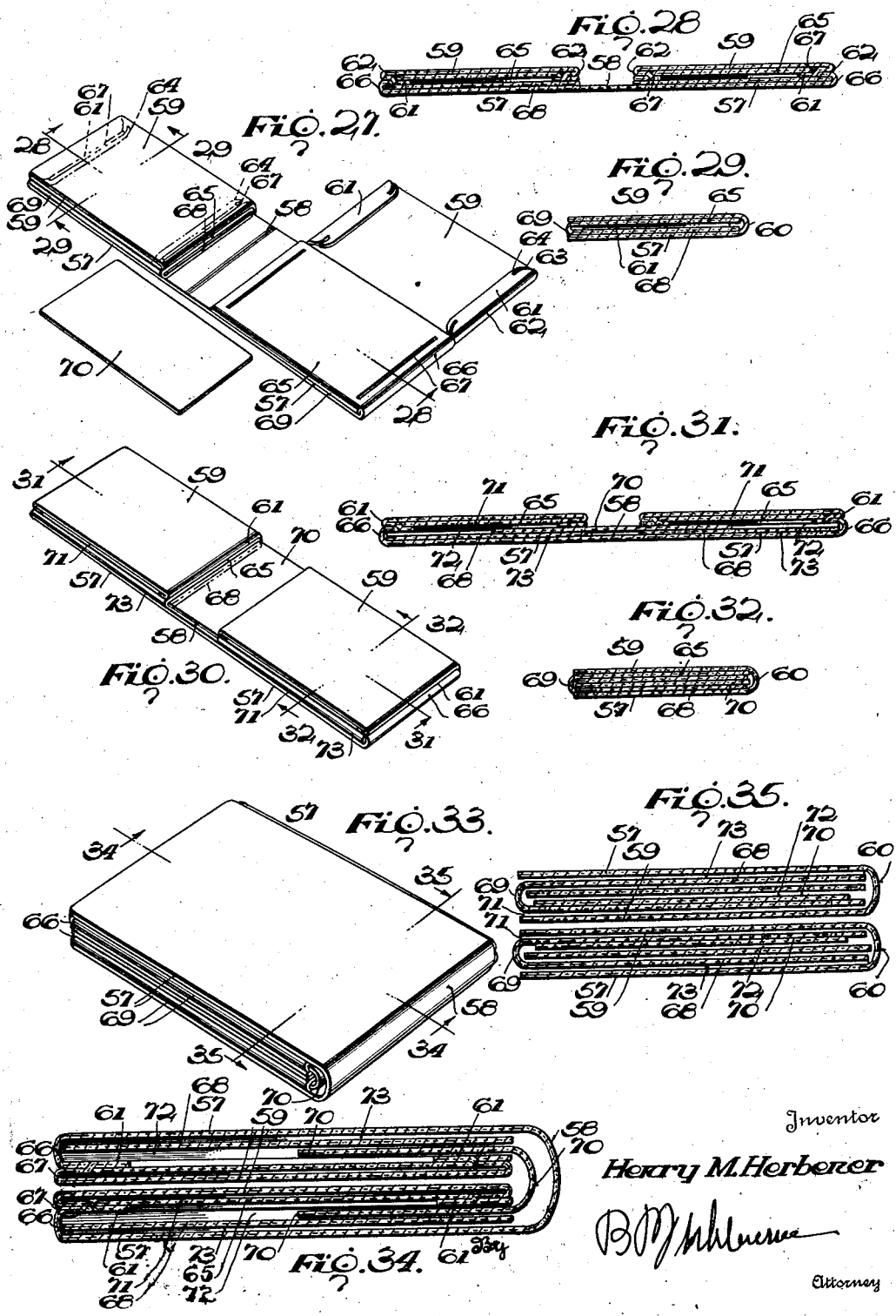

Aug. 26, 1947.   H. M. HERBENER   2,426,503
FOLDER, BILL FOLDER, AND POCKET CONSTRUCTION
Filed Oct. 29, 1943   10 Sheets-Sheet 7
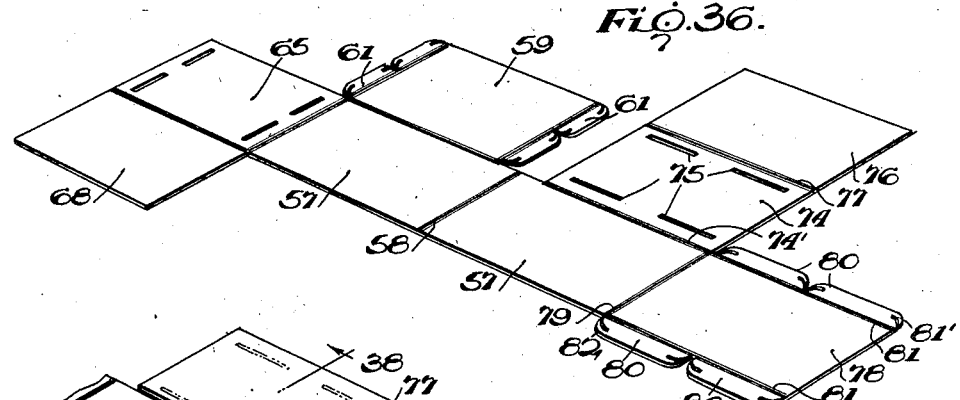
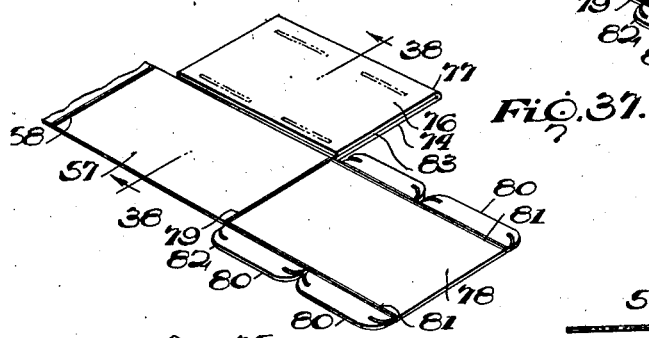
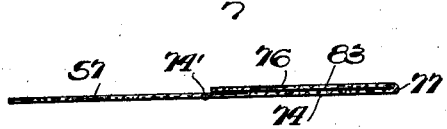
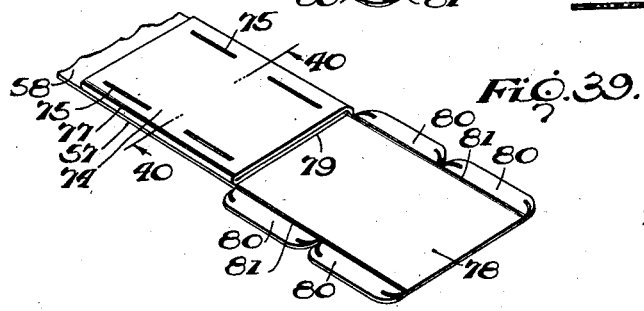
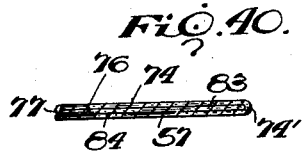
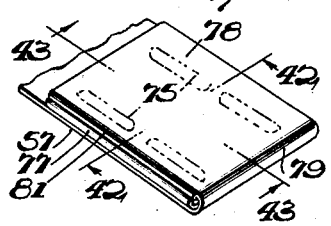
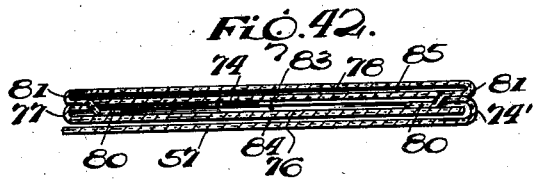
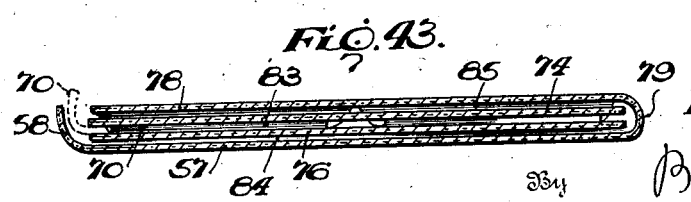
Inventor
Henry M. Herbener

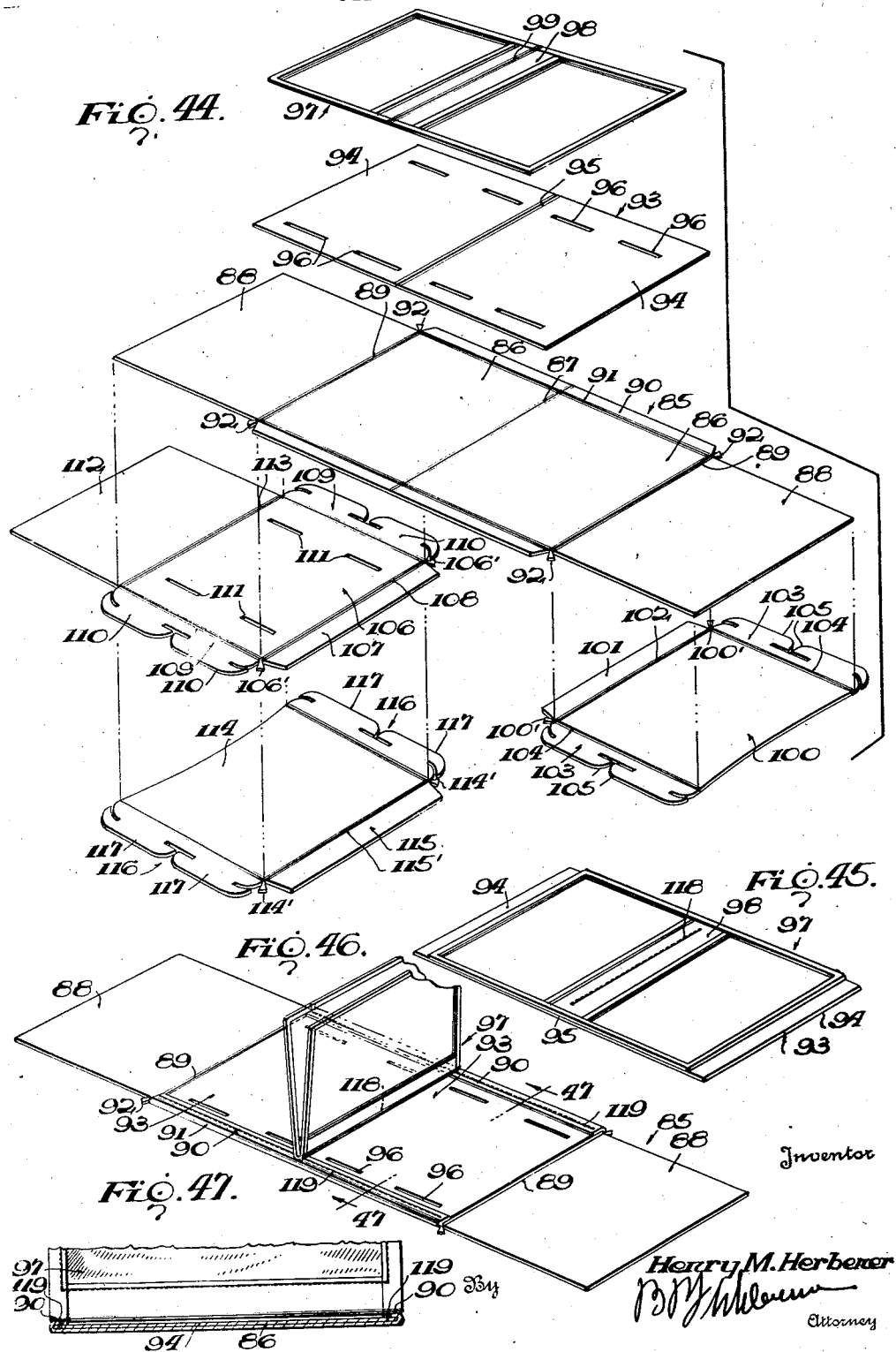
Aug. 26, 1947. H. M. HERBENER 2,426,503
FOLDER, BILL FOLDER, AND POCKET CONSTRUCTION
Filed Oct. 29, 1943 10 Sheets-Sheet 8
Inventor
Henry M. Herbener
Attorney Aug. 26, 1947.   H. M. HERBENER   2,426,503
FOLDER, BILL FOLDER, AND POCKET CONSTRUCTION
Filed Oct. 29, 1943   10 Sheets-Sheet 9
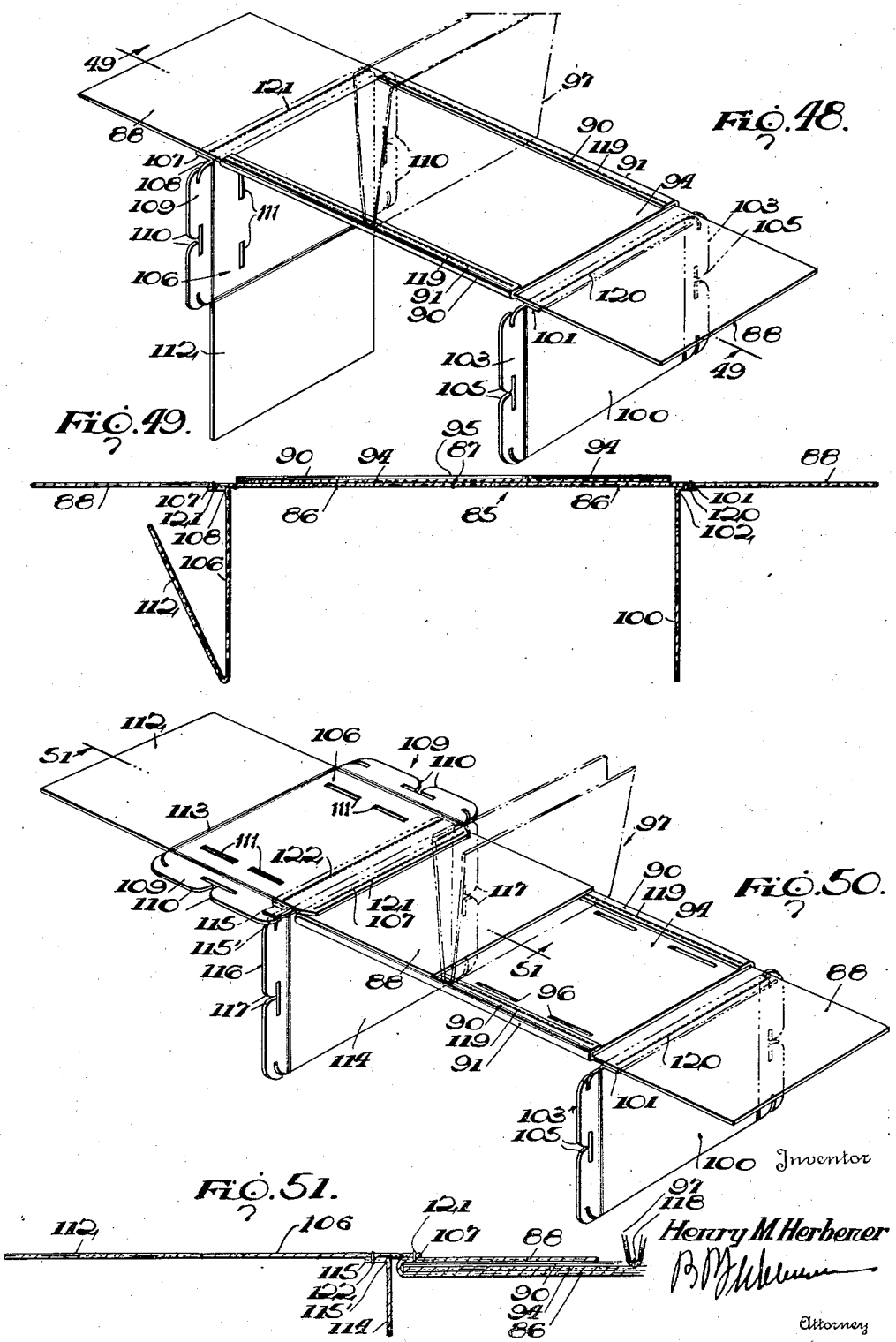

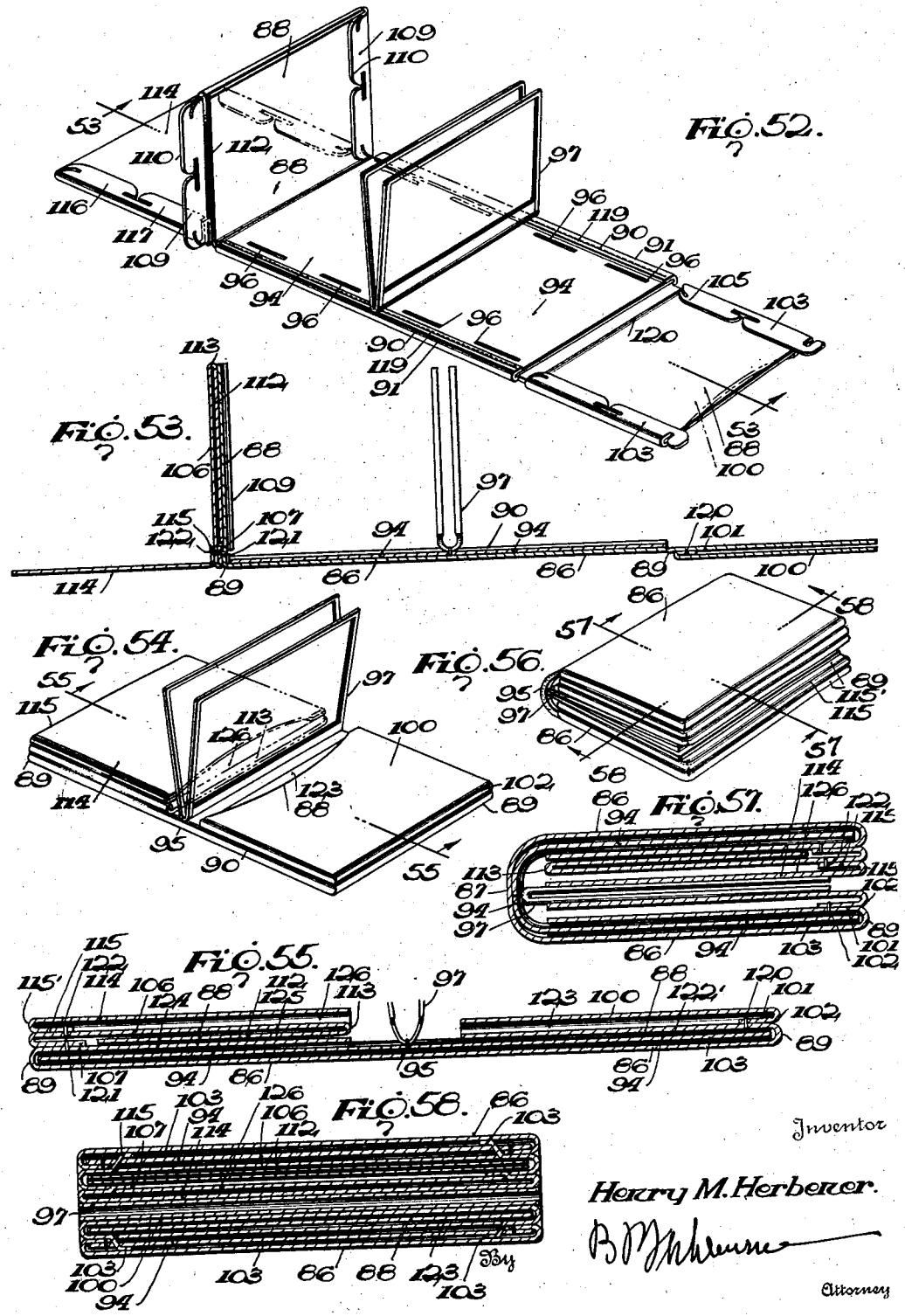

Patented Aug. 26, 1947

2,426,503

UNITED STATES PATENT OFFICE 2,426,503

FOLDER, BILL FOLDER, AND POCKET CONSTRUCTION

Henry M. Herbener, Thomasville, Ga.

Application October 29, 1943, Serial No. 508,123

9 Claims. (Cl. 150—38)

My invention relates to a folder, bill folder, and pocket construction.

An important object of the invention is to provide a pocket construction of the above mentioned character embodying a plurality of pockets arranged in overlapping relation to form a compact unit.

A further object of the invention is to provide a pocket construction of the above mentioned character which is neat in appearance and will have all stitching covered from exterior view.

A further object of the invention is to provide a pocket construction wherein the pocket extends throughout substantially the entire dimension of the sides of the pocket.

A further object of the invention is to provide a pocket construction formed from a folded blank and having locking tongues to secure parts together, and wherein a plurality of overlapping pockets are provided with the tongues projecting into one pocket and covered by a lining.

A further object of the invention is to provide a folder embodying pocket units, each pocket unit having a folded edge providing a bellows construction.

In the accompanying drawings forming a part of this application and in which like numerals are employed to designate like parts throughout the same, Figure 1 is a perspective view of the upper blank embodied in the pocket construction, Figure 2 is a similar view of the lower blank, Figure 3 is a similar view of the assembled upper and lower blanks, before stitching, Figure 4 is a similar view showing the outer side of the upper blank folded inwardly and the parts stitched, Figure 5 is a similar view showing the parts further assembled, Figure 6 is a similar view showing the pocket construction completely closed, Figure 7 is a transverse section taken on line 7—7 of Figure 6, Figure 8 is a longitudinal section taken on line 8—8 of Figure 6.

Figure 9 is an exploded perspective view of the blanks embodied in a second form of the invention, Figure 10 is a perspective view of the partly assembled upper and lower blanks, Figure 11 is a similar view showing one side of the upper blank in the folded position and parts stitched together, Figure 12 is a transverse section taken on line 12—12 of Figure 11, Figure 13 is a longitudinal section taken on line 13—13 of Figure 11, Figure 14 is a perspective view of the pocket construction, completely assembled, with one side open, Figure 15 is a longitudinal section taken on line 15—15 of Figure 14, Figure 16 is a transverse section taken on line 16—16 of Figure 14, Figure 17 is a perspective view of the pocket construction closed, Figure 18 is an enlarged longitudinal section taken on line 18—19 of Figure 17, Figure 19 is an enlarged transverse section taken on line 19—19 of Figure 17, Figure 20 is an exploded perspective view of the blanks, forming a third form of the invention, Figure 21 is a similar view showing the first folding step, Figure 22 is a transverse section taken on line 22—22 of Figure 21, Figure 23 is a longitudinal section taken on line 23—23 of Figure 21, Figure 24 is a similar view showing the next folding step, Figure 25 is a longitudinal section taken on line 25—25 of Figure 24, Figure 26 is a transverse section taken on line 26—26 of Figure 24, Figure 27 is a similar view showing the next folding step, Figure 28 is a longitudinal section taken on line 28—28 of Figure 27, Figure 29 is a transverse section taken on line 29—29 of Figure 27, Figure 30 is a perspective view of the assembled folder in the open position, Figure 31 is a longitudinal section taken on line 31—31 of Figure 30, Figure 32 is a transverse section taken on line 32—32 of Figure 30, Figure 33 is a perspective view of the completely assembled folder, closed, Figure 34 is a longitudinal section taken on line 34—34 of Figure 33.

Figure 35 is a transverse section taken on line 35—35 of Figure 33,

Figure 36 is a perspective view of the blank included in a further modification of the invention, Figure 37 is a similar view, showing the first folding step, parts broken away, Figure 38 is a transverse section taken on line 38—38 of Figure 37, Figure 39 is a perspective view of the blank, showing the next folding step, Figure 40 is a transverse section taken on line 40—40 of Figure 39, Figure 41 is a perspective view showing the next folding step, Figure 42 is a transverse section taken on line 42—42 of Figure 41, Figure 43 is a longitudinal section taken on line 43—43 of Figure 41, Figure 44 is an exploded perspective view of the blanks and associated elements included in a further modification of the invention, Figure 45 is a perspective view of the lining blank and associated elements, showing the first assembling step, Figure 46 is a similar view showing the next assembling step, Figure 47 is a transverse section taken on line 47—47 of Figure 46, Figure 48 is a perspective view of the blanks, showing a further assembling step, Figure 49 is a longitudinal section taken on line 49—49 of Figure 48, Figure 50 is a perspective view of the blanks, showing a further assembling step, Figure 51 is a longitudinal section taken on line 51—51 of Figure 50, Figure 52 is a perspective view of the blanks, showing a further assembling step, Figure 53 is a longitudinal section taken on line 53—53 of Figure 52, Figure 54 is a perspective view of the assembled folder, in the open position, Figure 55 is a longitudinal section taken on line 55—55 of Figure 54, Figure 56 is a perspective view of the assembled folder, in the closed position, Figure 57 is a longitudinal section taken on line 57—57 of Figure 56, and, Figure 58 is a transverse section taken on line 58—58 of Figure 56.

In Figures 1 to 8 inclusive, the upper blank includes sides 10 and 11, preferably formed integral and the side 11 is foldable upon a transverse line 12. The side 11 has longitudinal slits or slots 13, arranged near and spaced from its longitudinal edges, and these longitudinal slots terminate short of the ends of the side 11.

The lower blank includes an intermediate side 14 having end sides 15 and 16, preferably integral therewith and foldable upon transverse lines 17 and 18, respectively. The intermediate side 14 has longitudinal tongues 19 at its longitudinal edges, foldable upon longitudinal lines 20.

The side 15 has an inner tapered portion 21 and an outer laterally reduced portion 22, having locking tongues 23. These locking tongues include ends 24 and 25. The ends 25 are separated from the tapered portion 21 by slits or slots 26.

The side 16 is provided near its free end with a socket 27 of a snap fastener, the companion stud 28 of the socket being secured to the tapered portion 21, as shown.

In assembling the elements of the pocket construction, the side 10 is placed upon the side 14 and the longitudinal tongues 19 are folded inwardly over the longitudinal edges of the side 10, Figure 3. The side 11 is then folded upon the transverse line 12 and is arranged over the tongues 19. The overlapping side 11, tongues 19 and side 10 are secured together by lines of stitching 29, passing through these parts but not passing through the side 14. This stitching may be effected by a tubular work sewing machine. If desired, the side 11 may first be folded over the side 10 and one tongue 19 inserted between these sides and the sides 11 and 10 swung to an open flat position, whereby side 10, tongue 19 and side 11 may be stitched together when in the open flat position, subsequently to which the folded sides 11 and 10 are then swung over the side 14, and the other tongue 19 passed between the sides 11 and 10 and stitched to these sides by the tubular work sewing machine.

With the parts thus connected, the side 22 is now folded over the side 11 and the locking tongues 23 are passed inwardly through the slits or slots 13, and the ends 24 and 25 engage beneath the side 11, thus securely detachably connecting the side 22 with the side 11. This is illustrated in Figure 5. To completely close the pocket construction, the side 16 is folded over the side 22 upon the transverse line 18 and the socket 27 detachably receives the stud 28.

The side 10 forms with the side 14 a pocket 30, which extends throughout the entire width and length of the side 14, Figures 7 and 8 and has both ends open. The outer end of this pocket 30 is covered by the side 16 when this side is in the closed position and access may be had to the outer end of this pocket by opening the side 16. The side 10 forms with the side 11 an intermediate pocket 31, which extends through the width of the side 10 to the tongues 19 and throughout the entire length of the side 10. This pocket 31 is closed at one end at the folding lines 12 and open at its opposite end. The open end of the pocket 31 is covered by the side 22 when this side 22 is folded over the side 11. Access can be had to the pocket 31 by separating the side 22 from the side 11 and swinging the side 22 to the open position. The side 11 therefore closes the open end of the pocket 31. Since the side 22 is securely detachably connected to the side 11, the contents of the pocket 31 are protected from improper removal from the pocket 31. The side 22 when in the closed position forms with the side 11 a pocket 32, which is smaller than the pocket 31. The pocket 32 has an open end next to the folding line 18, and when the side 16 is in the closed position this side covers the open end of the pocket 32. The open end of the pockets 30 and 32 are both arranged near the folding line 18 and are both covered by the closed side 16 and by opening this closed side, access can be had to both pockets 30 and 32.

When in the closed position, the side 16 covers the lines of stitching 29, and these lines of stitching are also covered by the side 14, and hence the lines of stitching are not visible from the exterior of the pocket construction, when all parts thereof are closed.

In some instances I contemplate omitting the side 16 and associated fastener. When this is done one end of the pocket 30 will be permanently uncovered while the side 22 will close the open end of the pocket 31 and the open end of the pocket 32 will be permanently uncovered.

In Figures 9 to 19 inclusive I have shown a second form of the invention. The upper blank 34 comprises a side 35 preferably formed integral with a side 36, and the side 36 is foldable upon a transverse line 37. The side 36 has longitudinal slits or slots 38, spaced inwardly from its longitudinal edges, and terminating short of its ends, as shown.

The lower blank 39 comprises an intermediate side 40 and end sides 41 and 42, preferably formed integral. The side 41 is foldable upon a transverse line 43 and the side 42 is foldable upon a transverse line 44. The side 40 is provided at its longitudinal edges with tongues 45 foldable upon longitudinal lines 46, over the inner face of the side 40. The side 41 is provided at its longitudinal edges with longitudinal flaps 47, foldable inwardly upon longitudinal lines 48. These flaps provide a bellows formation at the longitudinal edges of the closed pocket construction. The flaps 47 are provided at their ends with slits 49 forming locking tongues 50, spaced outwardly from the folding lines 48. The side 42 is provided near its free end with a socket element 51 of a snap fastener for receiving the companion stud element 52, attached to the side 41 and arranged upon its outer face.

In assembling the parts of the pocket construction, the tongues 45 are bent inwardly over the inner face of the side 40 and the side 35 is arranged upon the inner face of the side 40, beneath the tongues 45, Figure 10. The side 36 is then folded over the side 35, upon the folding line 37, and is arranged upon the outer faces of the tongues 45, Figures 11, 12 and 13. The side 36, tongues 45 and side 35 are secured together by lines of stitching 53, passing through these parts but not through the side 40, Figure 12. The side 41 is then folded over the side 36, upon the folding line 43, and the flaps 47 are folded inwardly upon the lines 48, and the locking tongues 50 are inserted into the slots 38, whereby the side 41 is attached to the side 36 adjacent to its longitudinal edges. The side 41 has substantially the same width as the side 36 and by virtue of the flaps 47 forms a pocket 54, extending throughout substantially the entire width of the sides 41 and 36. This pocket is open at its inner end and closed at its outer end. The flaps 47 form bellows constructions at the longitudinal edges of the pocket. The side 35 forms with the side 40 a pocket 55, the side 35 constitutes a lining between the locking tongues 50 and this pocket. The pocket 55 is open at its inner end and closed at its outer end. The side 42 is foldable upon the line 44 over the side 41, covering the upper ends of the pockets 54 and 55, the socket 51 receiving the stud 52.

Instead of using the side 42, a second unit including pockets 54 and 55 may be substituted therefor.

In Figures 20 to 35 inclusive I have shown a third form of the invention. This form of the invention embodies a bill folder having pockets. The numeral 56 designates an integral blank comprising intermediate sides 57, foldable upon a transverse line 58. At one of their longitudinal edges, the sides 57 carry inner lateral sides 59 foldable upon longitudinal lines 60. The outer ends of the sides 57 terminate at the outer ends of the sides 59, while the inner ends of the sides 57 extend beyond the inner ends of the sides 59, as shown. Each side 59 is provided at its opposite ends with transverse flaps 61 foldable upon transverse lines 62. The flaps 61 are provided with slits 63, forming locking tongues 64. Formed upon the outer ends of the intermediate sides 57 are end-sides 65, foldable upon transverse lines 66. These end-sides are provided near and spaced from their opposite ends with transverse slits 67, the ends of which terminate short of the longitudinal edges of the sides 65. The end-sides 65 carry outer lateral sides 68 foldable upon longitudinal lines 69. The sides 68 are of the same length as the sides 65.

The numeral 70 designates a lining section.

In assembling various parts of the folder, the outer lateral sides 68 are first folded over the end sides 65, Figures 21, 22 and 23. The superposed sides 68 and 65 are now folded over the upper faces of the sides 57 and the sides 68 are next to the sides 57, Figures 24, 25 and 26. The inner lateral sides 59 are now folded inwardly over the sides 65, Figures 27, 28 and 29. The flaps 61 are folded inwardly upon the inner faces of the inner lateral sides 59 and the locking tongues 64 are inserted inwardly through the slits 67 and secure the inner lateral sides 59 to the sides 65 adjacent to their opposite ends. The tongues 61 form bellows constructions, at the ends of the inner lateral sides 59. The sides 59 form with the sides 65 pockets 71, closed at one longitudinal edge and open at the opposite longitudinal edge. By virtue of the flaps 61 these pockets extend throughout the entire length of the sides 59. The sides 65 form with the sides 68 spaces or pockets 72, receiving the ends of the lining section 70, extending across the folding line 58. The sides 68 form with the sides 57 pockets 73 and these pockets 73 are closed at one longitudinal edge and open at the opposite longitudinal edge and have their inner ends open, so that the bills may be introduced therein and placed upon the intermediate sides 57 and extend across the folding line 58.

As shown in Figure 30, the assembled bill folder is arranged in the open position and the bills are arranged within the pockets 73 beneath the lining section 70 and these bills correspond generally to the combined length of the pockets 73. When the bill folder is closed, Figure 33, it folds upon the line 58, causing the bills to transversely fold upon this line. Access may be readily had to the pockets 71, adapted for holding cards or the like. When the folder is opened, as shown in Figure 30, access may be had to the open ends of the pockets 71.

In Figures 36 to 43 inclusive I have shown a further modification of the invention. The same intermediate sides 57 are used, foldable upon the transverse line 58, as shown in Figures 20 to 34 inclusive. One intermediate side 57 carries the same inner lateral side 59 equipped with the flaps 61. This side 57 carries the same end-side 65, in turn carrying the same outer lateral side 68. When the sides 68, 65 and 59 are folded to the assembled position, they produce the same pockets as described in connection with Figures 20 to 35 inclusive.

The companion intermediate side 57 carries an inner lateral side 74, foldable upon a longitudinal line 74', provided with pairs of longitudinal slits or slots 75, arranged near and spaced from the longitudinal edges of the side 74 and spaced from its ends. The side 74 carries a second lateral side 76, foldable upon a longitudinal line 77. The intermediate side 57 carries an end-side 78 foldable upon a transverse line 79. The end-side 78 is provided with longitudinal flaps 80, foldable upon longitudinal lines 81 and these flaps have slits 81' forming locking tongues 82, spaced outwardly from the lines 81.

In assembling, the side 76 is folded over the side 74 upon the line 77, Figures 37 and 38, forming a pocket 83. The assembled sides 76 and 74 are then folded upon the line 74' over the side 57, Figures 39 and 40. In this arrangement the side 76 is next to the side 57 and the side 74 is uppermost. The side 76 forms with the side 57 a pocket 84. The end-side 78 is now folded upon the line 79 over the side 74, Figure 41, and the flaps 80 are folded inwardly upon the lines 81 and the locking tongues are passed into the slots 75. The side 78 forms with the side 74 a pocket 85, open at its inner end. The same lining section 70 is inserted in the inner ends of the pockets 83. The flaps 89 form bellows constructions at the longitudinal edges of the pocket 84 and this pocket extends throughout the entire width of its sides.

It is thus apparent that bill receiving pockets are arranged next to the sides 57 and these bill receiving pockets are open at one longitudinal edge. The other pockets are opened at their inner ends. The bill folder is foldable upon the transverse line 58 to assume a closed position, in a similar manner as described in connection with the form of the invention shown in Figures 20 to 35 inclusive.

In Figures 44 to 58 I have shown a further modification of the invention. The numeral 85 designates a main blank including intermediate sides 86, foldable upon a transverse line 87. The sides 86 carry end-sides 88, foldable upon transverse lines 89. The intermediate sides 86 are provided at their longitudinal edges with longitudinal tongues 90, foldable inwardly over the sides 86 upon lines 91. At the outer corners of the sides 86 are small tapered tongues 92, foldable inwardly upon the sides 86, to provide neat folded corners.

Numeral 93 designates a lining blank, including sides 94, foldable upon a transverse line 95. Each side 94 has a pair of spaced longitudinal slits or slots 96, spaced from the longitudinal edges of the sides 94 and spaced from the ends of the same, as shown.

The numeral 97 designates a pair of pockets, connected by an intermediate portion 98, and foldable upon a transverse line 99. The opposite sides of these pockets are preferably formed of transparent material. The inner ends of these pockets are open and are adapted to receiving license cards or the like.

The numeral 100 designates a side, for co-action with the right side 88, Figure 44, and this side is provided at its inner end with a transverse flap 101, foldable upon a transverse line 102. The side 100 is provided at its longitudinal edges with longitudinal flaps 103, foldable upon longitudinal lines 104. Each flap is provided with pairs of locking tongues 105, as shown. At its corners, between the flaps 101 and 103, the side 100 has small tongues 100', foldable inwardly over the same to provide folded corners.

Arranged near the left side 88, Figure 44, is a side 106, provided at its inner end with a transverse flap 107, foldable upon a transverse line 108. The side 106 is provided at its longitudinal edges with longitudinal flaps 109, having pairs of locking tongues 110. The side 106 is provided with pairs of longitudinal slits or slots 111. The slits in each pair are spaced from each other and are spaced from the longitudinal edges of the side 106 and from its ends, as shown. The side 106 is provided at its corners, between the flaps 107 and 109, with small tongues 106', foldable inwardly to produce folded corners. The side 106 carries a side 112, foldable upon a transverse line 113.

For co-action with the side 106 is a side 114, provided at one end with a flap 115, foldable upon a line 115'. The side 114 is provided at its longitudinal edges with longitudinal flaps 116, having pairs of locking tongues 117. At its corners, between the flaps 116 and 115, the side 114 has small tongues 114', folded inwardly to produce folded corners.

In assembling the various parts of the device, the pairs of pockets 97 are first positioned upon the lining blank 93 and these elements are stitched together at the folding lines 99 and 95 by a line of stitching 118, terminating short of the ends of the intermediate connecting portion 98, Figure 45. The pockets 97 may be shifted to the closed position and the lining blank 93 placed upon the blank 85 so that the sides 94 register with the sides 86 and the tongues 90 are folded over the longitudinal edges of the sides 94 and the tongues 90 and sides 94 are stitched together by longitudinal lines of stitching 119, which do not pass through the sides 86, Figures 46 and 47. The flap 101 of the side 100 is now arranged upon the outer or lower face of the right side 88, Figure 48, and the flap 101 is secured to the side 88 by a line of stitching 120, which follows the free marginal edge of the flap 101. The flap 107 of the side 106 is secured to the lower or outer face of the left side 88, Figure 48, by a line of stitching 121, which follows the free marginal edge of the flap 107, these stitching operations are indicated in Figure 49. In Figure 50, the right side 88 is still in the open position with the side 100 depending from it. The left side 88 has been folded over the tongues 90 and the sides 106 and 112 are horizontally arranged. The side 114 is now depending beneath the side 106 and the flap 115 is engaging the lower face of the side 106 and is secured to the side 106 by a line of stitching 122 which follows the free marginal edge of the flap 115. This arrangement is also shown in Figure 51. As shown in Figure 52, the side 100 is now swung upwardly to engage the outer face of the side 88 and the flaps 103 are folded upon the inner face of the side 88. The left side 88 is arranged in an upstanding position, Figure 52. The side 106 is swung to the upstanding position and the side 112 is folded downwardly over the inner face of the side 106 and is disposed between the side 88 and the side 106. The flaps 109 are now folded inwardly upon the inner face of the side 86. The sides 88 and 100 are now folded upon the transverse line 89 to a position upon the right side 94, Figure 52, and the locking tongues 105 are passed into the pairs of right slits 96. The side 88 forms with the side 94 a pocket 122' and the side 100 forms with the side 88 a pocket 123, both of these pockets having openings at their inner ends, adjacent to the folding lines 95 and 87. These pockets have a width extending throughout the entire width of their sides, and the flaps 103 provide bellows constructions at the longitudinal edges of the folder. The assembled sides 88, 106 and 112 are now swung over the left side 94, Figure 55, and the tongues 110 of the flaps 109 are inserted into the pairs of left slits 96. The side 114 has its flaps 116 folded inwardly and the side 114 is folded over the side 106 and the tongues 117 are inserted within the pairs of slits 111 of the side 106. The side 88 forms with the side 94 a pocket 124 and the side 88 forms with the side 112 a pocket 125. The side 114 forms with the side 106 a pocket 126. These pockets have a width extending throughout the entire width of their sides. The flaps 109 and 116 form bellows constructions at the longitudinal edges of the device. The sides 94 cover the locking tongues 105 and 110, while the side 112 covers the locking tongues 117. With the parts thus assembled, Figures 54 and 55, the entire folder may be closed, by folding upon the lines 95 and 87, Figures 56, 57 and 58. It is thus apparent that I have provided a folder including a body portion having a pocket unit at one end providing two pockets and a pocket unit at the other end providing three pockets. The number of pockets for each pocket unit may be increased or decreased. All edges are folded or rounded and a bellows construction is provided at all edges. The pockets 97 are held between these pocket units when the folder is closed.

The several blanks or parts of various forms of the invention are formed of suitable material, such as leather, artificial leather or the like.

It is to be understood that the forms of my invention herewith shown and described are to be taken as preferred examples of the same, and that various changes in the shape, size, and arrangement of parts, may be resorted to without departing from the spirit of my invention or the scope of the sub-joined claims.

Having thus fully described my invention, what I claim is:

1. A folder, comprising a body portion including intermediate sides foldable upon a transverse line, a lining for the body portion including sides foldable upon a transverse line, the lining sides having longitudinal slits near their longitudinal edges, end sides carried by the intermediate sides, outer sides having transverse flaps folded upon their inner faces and secured to the end sides, the outer sides having longitudinal flaps foldable over the inner faces of the end sides and having locking tongues, the assembled end and outer sides being foldable over the inner face of the lining sides and the locking tongues being inserted in the longitudinal slits, the outer sides forming pockets with the end sides and the end sides forming pockets with the lining sides.

2. A folder, comprising a body portion including intermediate sides foldable upon a transverse line, said sides having longitudinal tongues at their edges, a lining arranged upon the inner face of the intermediate sides and including sides foldable upon a transverse line, the longitudinal tongues being foldable over the inner faces of the lining sides and stitched to the same, the lining sides having longitudinal slits near their longitudinal edges, end sides carried by the intermediate sides and foldable upon transverse lines, outer sides having transverse flaps at their inner ends and foldable upon their inner faces and secured to the end sides, the outer sides having longitudinal flaps at their longitudinal edges foldable over the inner faces of the end sides and having locking tongues, the assembled end and outer sides being foldable over the inner face of the lining sides and the locking tongues being inserted in the longitudinal slits, the outer sides forming pockets with the end sides and the end sides forming pockets with the lining sides, the flaps forming a bellows construction at the edges of the pockets.

3. A folder, comprising a body portion including intermediate sides foldable upon a transverse line, a lining for the body portion including sides foldable upon a transverse line, the lining sides having longitudinal slits near their longitudinal edges, end sides carried by the outer ends of the intermediate sides and foldable upon transverse lines, an outer side disposed upon the outer face of one end side and provided at its inner end with a transverse flap folded upon its inner face and secured to the last named end side adjacent to its marginal edge, the outer side having longitudinal flaps at its longitudinal edges foldable over the inner face of the last named end side and having locking tongues, the assembled outer side and end side being foldable over one lining side and the locking tongues of the longitudinal flaps engaging within the slits of such lining side, a second outer side disposed upon the outer face of the other end side and provided at its inner end with a transverse flap folded over its inner face and secured to the last named end side, the second named outer side being provided at its longitudinal edges with flaps having locking tongues, the flaps being folded over the inner face of the last named end side, the second named outer side having longitudinal slits near its longitudinal edges, a side carried by the outer end of the second named outer side and foldable over the inner face of the second named outer side, the assembled second named outer side, last named side and last named end side being foldable over the adjacent lining side and the locking tongues passed within the slits of the last named lining side, and a third outer side disposed upon the outer face of the second outer side and provided at its inner end with a transverse flap folded upon its inner face and secured to the second outer side, the third outer side being provided at its longitudinal edges with longitudinal flaps foldable upon its inner face and having locking tongues inserted within the slits of the second outer side, the first outer side forming with the adjacent end side a pocket and the last named end side forming a pocket with the adjacent lining side, the third outer side forming a pocket with the second outer side, the second outer side forming a pocket with the adjacent end side, and the last named end side forming a pocket with the adjacent lining side, the flaps forming a bellows construction at the edges of said pockets.

4. A folder, comprising a body portion including sides foldable upon a transverse line, the sides being provided inwardly of and near their longitudinal edges with openings, an extension connected with each side and foldable adjacent to the outer end of each side over the inner face of such side, a second side disposed opposite each side and provided at its inner end with a transverse tongue folded upon its inner face and secured to the extension outwardly of the folding line of the extension, the second side being provided at its longitudinal edges with flaps folded upon its inner face and having locking tongues inserted within said openings, the second side forming a pocket with the adjacent side member and the transverse tongue and flaps forming a bellows construction at the edges of the pocket.

5. A pocket construction comprising a side provided at its longitudinal edges with inwardly folded tongues, a second side disposed upon the inner face of the first side and extending to the longitudinal tongues and attached to said tongues, the second side having openings arranged inwardly of and near its longitudinal edges, and a third side provided at one end with a transverse tongue folded inwardly over the same and at its longitudinal edges with flaps folded inwardly over the same, said flaps having locking tongues, means to attach the transverse tongue to the first side so that the third side may be arranged in overlapping relation to the first and second sides, the locking tongues being inserted within the openings and covered by the second side, the third side forming with the second side a pocket having a width substantially equal to the width of the second side and the transverse tongue and flaps forming a bellows construction at the edges of such pocket.

6. A folder, comprising a body portion including sides foldable upon a transverse line, the sides being provided inwardly of and near their longitudinal edges with openings, extensions, means for securing the extensions to the sides so that the extensions are foldable upon transverse lines adjacent to the outer ends of the extensions, second sides assembled opposite the first side and provided at their inner ends with transverse tongues folded inwardly and secured to the extensions outwardly of the folding lines of the extensions, the second sides being provided at their longitudinal edges with flaps which are folded inwardly, said flaps having locking tongues inserted within the openings, the second sides forming with the first side's pockets and the transverse tongues and flaps forming a bellows construction at the edges of the pockets.

7. A pocket construction, comprising a first side having longitudinal tongues at its longitudinal edges which extend for substantially the entire length of the first side, the tongues being folded inwardly over the inner face of the first side to provide rounded edges, a second side disposed opposite the inner face of the first side and being of substantially the same shape and size as the first side, the second side being secured near its longitudinal edges to the longitudinal tongues, the second side having openings spaced inwardly from its longitudinal edges, and a third side arranged opposite the second side and attached at its end to the first side and being of substantially the same shape and size as the second side, the third side having flaps at its longitudinal edges which are folded inwardly to provide rounded edges and said flaps being disposed between the second and third sides, said flaps having locking tongues, the locking tongues being inserted in the openings and arranged between the second side and first side and covered by the second side, the third side and second side and inwardly folded flaps forming a pocket extending substantially throughout the entire width of the second side.

8. A folder, comprising outer sides provided at their longitudinal edges with tongues folded inwardly over the inner faces of such sides, the outer sides being provided at their outer ends with extensions folded over the inner faces of such sides, said sides being provided at their corners with small flaps which are arranged between and separate from the tongues and extensions, the flaps being foldable upon the inner face of such sides to provide blunt turned-edge corners, partition elements arranged upon the inner faces of the sides and secured to the longitudinal tongues, pocket forming sides, each pocket forming side being provided at its end with an attaching tongue and at its longitudinal edges with longitudinal tongues and at its corners with small flaps which are arranged between and separate from the attaching tongue and longitudinal tongues, the end tongue being folded upon the inner face of the pocket forming side and secured to the adjacent extension, the longitudinal tongues of the pocket forming side being folded upon its inner face and secured to the adjacent partition element.

9. A folder, comprising outer sides which are connected at their inner ends and provided at their longitudinal edges with tongues folded inwardly over the inner face of such sides, the outer sides being provided at their outer corners with small flaps arranged adjacent to the tongues and separate therefrom and foldable upon the inner face of such sides to provide blunt turned-edge corners, partition elements arranged upon the inner faces of the outer sides and secured to the longitudinal tongues, pocket forming sides, each pocket forming side being provided at its longitudinal edges with longitudinal tongues and at its outer corners with small flaps which are separate from the longitudinal tongues of the pocket forming side and are adapted to be folded upon the inner face of such side to provide blunt turned-edge corners, the longitudinal tongues of the pocket forming side being folded upon the inner face of such side and secured to the adjacent partition element, and means for connecting the outer end of each pocket forming side with the outer end of the adjacent outer side.

HENRY M. HERBENER.

REFERENCES CITED

The following references are of record in the file of this patent:

UNITED STATES PATENTS

| Number | Name | Date |
| --- | --- | --- |
| 2,346,571 | Ginsberg | Apr. 11, 1944 |
| 1,694,186 | L'Enfant | Dec. 4, 1928 |
| 2,252,586 | Swanson | Aug. 12, 1941 |
| 2,288,704 | Herbener | July 7, 1942 |
| 2,346,434 | Herbener | Apr. 11, 1944 |
| 1,877,911 | L'Enfant | Sept. 20, 1932 |
| 1,824,943 | Buxton | Sept. 29, 1931 |
| 2,150,989 | Setal | Mar. 21, 1939 |
| 1,969,835 | Buxton | Aug. 14, 1934 |
| 2,331,802 | Rosenkrantz | Oct. 12, 1943 |
| 117,858 | Braunhold | Aug. 8, 1871 |
| 2,335,051 | Gardner | Nov. 23, 1943 |
| 2,277,104 | Herbener | Mar. 24, 1942 |
| 2,291,259 | Sherwood | July 28, 1942 |
| 2,352,383 | Herbener | June 27, 1944 |